(12) United States Patent
Kamijoh et al.

(10) Patent No.: US 9,065,638 B2
(45) Date of Patent: Jun. 23, 2015

(54) SYSTEM, METHOD, AND PROGRAM FOR INFORMATION MANAGEMENT

(75) Inventors: Kohichi Kamijoh, Kanagawa-ken (JP); Hisashi Miyashita, Kanagawa-ken (JP); Hiroaki Nakamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/572,729

(22) Filed: Aug. 13, 2012

(65) Prior Publication Data

US 2013/0046975 A1 Feb. 21, 2013

(30) Foreign Application Priority Data

Aug. 17, 2011 (JP) .................................. 2011-178231

(51) Int. Cl.
*H04L 9/08* (2006.01)
*G06F 21/62* (2013.01)

(52) U.S. Cl.
CPC .......... *H04L 9/0836* (2013.01); *G06F 21/6209* (2013.01)

(58) Field of Classification Search
None
See application file for complete search history.

(56) References Cited

U.S. PATENT DOCUMENTS

| | | | |
|---|---|---|---|
| 8,590,011 B1 * | 11/2013 | Legault et al. ................... | 726/3 |
| 2005/0050354 A1 * | 3/2005 | Gociman ........................ | 713/201 |
| 2006/0069662 A1 * | 3/2006 | Laborczfalvi et al. ............ | 707/1 |
| 2008/0210747 A1 * | 9/2008 | Takashima .................... | 235/375 |
| 2012/0297206 A1 * | 11/2012 | Nord et al. ..................... | 713/193 |

FOREIGN PATENT DOCUMENTS

| | | |
|---|---|---|
| JP | 2001022781 A | 1/2001 |
| JP | 2007318583 A | 12/2007 |
| JP | 2010-165620 A | 7/2010 |
| JP | 2013041439 A | 2/2013 |
| WO | 2005122464 A1 | 12/2005 |
| WO | 2011086668 A1 | 7/2011 |

OTHER PUBLICATIONS

Kafura et al, "First experiences using XACML for access control in distributed systems", XMLSEC '03 Proceedings of the 2003 ACM workshop on XML security,pp. 25-37, ACM New York, NY, US.
A. Fiat and M. Naor, "Broadcast Encryption", Crypto'93, LNCS 773, 1993.

* cited by examiner

*Primary Examiner* — David Le
(74) *Attorney, Agent, or Firm* — Reza Sarbakhsh; Jennifer R. Davis

(57) ABSTRACT

A system and method of decrypting is provided. The method includes grouping domain data of the domain for authorized parties, encrypting a group of leaves in the grouped data having a tree structure using a common key, generating first public data, obtaining a common key by decrypting the first public data using a secret key of a link creator and decrypt the groups using the common key and the secret key, generating a, propagating records, generating second public data by encrypting the table using a common key, obtaining a common key by decrypting the first public data and the second public data using a secret key and generating a view by decrypting data received from a method for the link creator using the common key obtained by decrypting the first public data and the second public data using the secret key.

13 Claims, 18 Drawing Sheets decryptLT(N,T)

SYSTEM, METHOD, AND PROGRAM FOR INFORMATION MANAGEMENT

CROSS-REFERENCE TO RELATED APPLICATION

This application claims priority under 35 U.S.C. §119 from Japanese Patent Application No. 2011-178231 filed Aug. 17, 2011, the entire contents of which are incorporated herein by reference.

BACKGROUND OF THE INVENTION

1. Field of the Invention

The present invention generally relates to an information management system and more specifically to an information management system, method, and program for managing links or associations between pieces of information in different domains.

2. Description of Related Art

Traditionally, in the industries of automobile, electric machinery, aerospace, defense, and the like, products are generally complicated and composed of many components. The design of a single product requires involvement of many domains (organizations) such as machinery, electricity, system design, software, and testing. Even with many separate organizations, components must eventually be integrated into a single product. Accordingly, pieces of data must be linked between the domains.

FIG. 1 is a diagram showing an example of the associations between different domains in an automobile manufacturer. As seen in FIG. 1, pieces of data are linked together between different domains: system model, requirement management, control analysis, CAD, electric/electronic circuit, component configuration management, and installed software.

However, since pieces of data are associated with each other between the domains on an ad hoc basis, it is difficult to secure the traceability of the entire integrated product or perform impact analysis. One of the causes of such difficulties is that experts are using different tools in the different domains. To eliminate this cause, a unified tool is preferably used among all the domains. Unfortunately, the experts in the domains desire to use the tools they are accustomed to use. Further, the function that the tool is required to have varies depending on the domains. In reality, the tools are difficult to unify.

For this reason, a technology is desired where information can be managed using the existing tool in each domain and which presents a view across an entire product by centrally managing only pieces of information associated between the domains and thus facilitates collaboration between the experts. FIG. 2 shows an outline of such a desired technology. Specifically, an inter-data link management function 210 as shown in FIG. 2 is desired that provides a view 212 of the associations between pieces of information in domains 202, 204, 206, and 208.

In Japanese Patent Application No. 2010-165620, a technique for linking pieces of data between domains. However, this technique is insufficient to perform data linkage and link management in such a manner that the security of domain data is protected, in situations where multiple organizations and/or corporations are involved in the development of a product.

Further, for example, Seth Proctor, Rebekah Lepro, Dennis Kafura, Sumit Shah, "First experiences using XACML for access control in distributed systems," Proceeding XMLSEC '03 Proceedings of the 2003 ACM workshop on XML security proposes performing access control using XACML when data is placed as distributed in a distributed system. By using XACML, there is also provided an access propagation technique for propagating link information to the host node when data is placed in graph form.

However, even this XACML technique disadvantageously fails to change a data view including a link on the basis of a determination of access permission while maintaining consistency.

A. Fiat and M. Naor, Broadcast Encryption, Crypto'93, LNCS 773, 1993 discloses a technology that allows secure information to be transmitted to a receiver whose central broadcasting site is designated while minimizing transmission of information related to key management.

Accordingly, it is an object of the present invention to properly provide a view including a link in accordance with access permission when pieces of data are linked between domains.

It is another object of the present invention to make it possible to know on the hierarchy the existence of a link, as well as data to which data serving as a link source belongs and data to which data serving as a link destination belongs, even when none of the data serving as a link source and the data serving as a link destination is directly accessible.

According to the present invention, it is possible to perform data linkage and link management in such a manner that the security of domain data is protected, in situations where multiple corporations are involved in the development of a product. Thus, the associations between pieces of product information of different corporations can centrally be managed.

Even when the referrer cannot access any of data serving as a link source or data serving as a link destination, the referrer can know on the hierarchy the existence of a link, as well as data to which the data serving as a link source belongs and data to which the data serving as a link destination belongs. The information is properly disclosed as long as the security is maintained. Even when the intended data is insufficient, the referrer can perform tasks such as impact analysis.

The referrer can know the existence of data which is insufficient for the purpose, as well as an element to which the data belongs. The referrer can request the data owner to permit reference or can negotiate with the data owner for providing of binary instead of source. The present invention provides a mechanism for generating a view including a link under the assumed limitations in such a manner that the designation of the authorized party is satisfied.

SUMMARY OF THE INVENTION

In one aspect of the invention, a computer-implemented system for providing a view of links between pieces of domain data having a tree structure in a plurality of domains stored in computers in accordance with given access permission is provided. The system includes means configured to, in each of the domains, group domain data of the domain for authorized parties designated in accordance with the hierarchy of the domain, means configured to encrypt a group of leaves in the grouped data having a tree structure using a common key, means configured to generate first public data by adding a value to the data encrypted using the common key, the value being obtained by encrypting a common key of all groups using a public key of a authorized party, means configured to obtain a common key by decrypting the first public data using a secret key of a link creator and decrypt the groups using the common key and the secret key, means configured to generate a table for each group on the basis of a link in decrypted data, means configured to propagate records of the table to a parent having a tree structure, means configured to generate second public data by encrypting the table using a common key, means configured to obtain a common key by decrypting the first public data and the second public data using a secret key, and means configured to generate a view by decrypting data received from a system of the link creator using the common key obtained by decrypting the first public data and the second public data using the secret key.

In a second aspect of the invention, a computer-implemented method for providing a view of links between pieces of domain data having a tree structure in a plurality of domains stored in computers in accordance with given access permission is provided. The method includes the steps of, in each of the domains, grouping domain data of the domain for authorized parties designated in accordance with the hierarchy of the domain, encrypting a group of leaves in the grouped data having a tree structure using a common key, generating first public data by adding a value to the data encrypted using the common key, the value being obtained by encrypting a common key of all groups using a public key of a authorized party, obtaining a common key by decrypting the first public data using a secret key of a link creator and decrypt the groups using the common key and the secret key, generating a table for each group on the basis of a link in decrypted data, propagating records of the table to a parent having a tree structure, generating second public data by encrypting the table using a common key, obtaining a common key by decrypting the first public data and the second public data using a secret key and generating a view by decrypting data received from a method for the link creator using the common key obtained by decrypting the first public data and the second public data using the secret key.

DETAILED DESCRIPTION OF THE PREFERRED EMBODIMENTS

Figure 1:
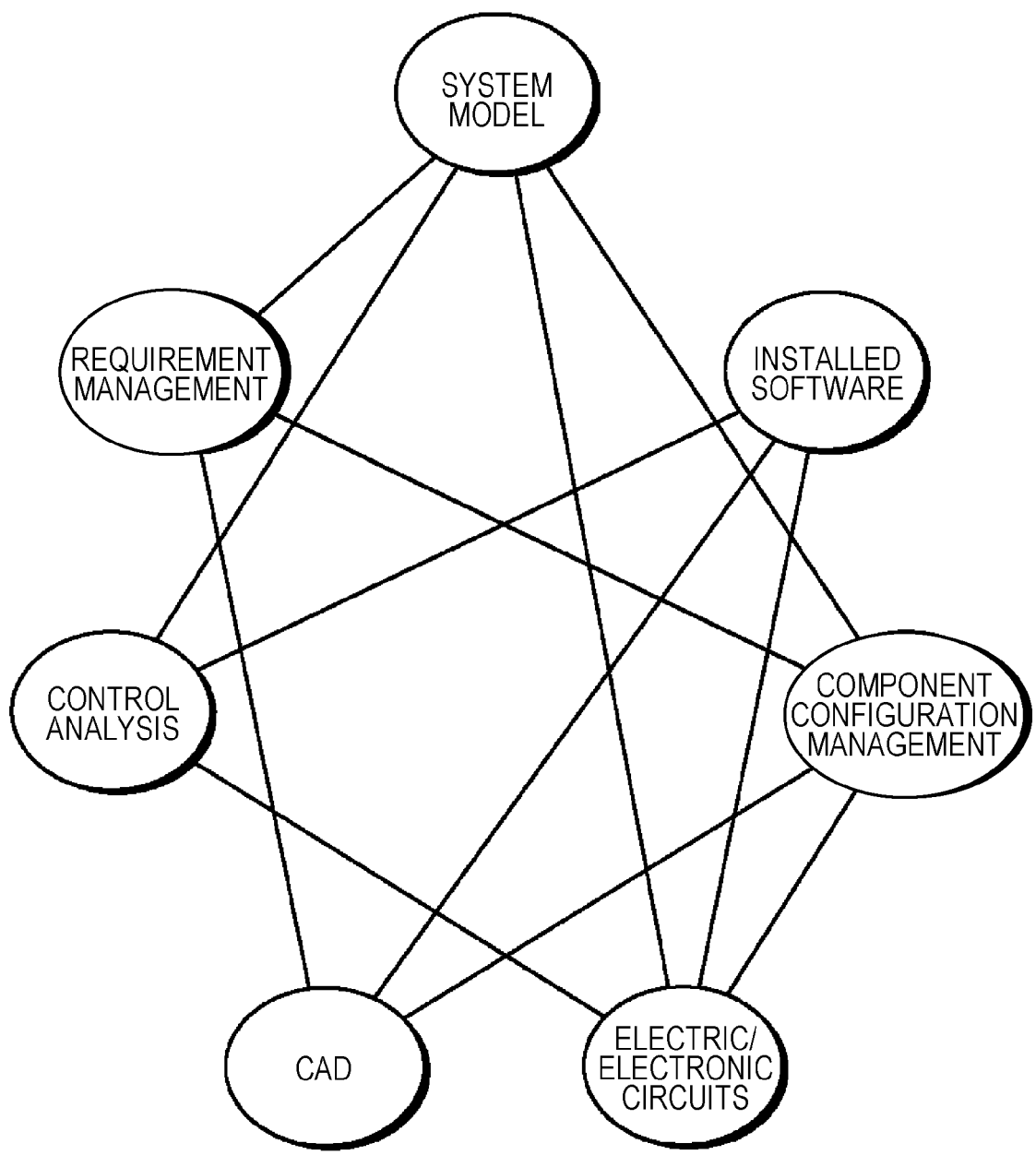
FIG. 1 is a diagram showing an example of the associations between different domains.

A system according to the present invention includes a portion related to a process performed by a domain data owner and a portion related to a process performed by a link creator, and a portion related to a process performed by a referrer.

A system of a portion related to a process performed by the domain data owner groups the same authorized parties in accordance with the hierarchy of data. Subsequently, a group of leaves are encrypted using a common key. The encrypted group is then replaced with an element of a name. This process is repeated. Subsequently, the system adds to data indicating an authorized party a value obtained by encrypting the common key of all the groups using the public key of the data indicating an authorized party and thus makes the data indicating an authorized party into public data.

A system of a portion related to a process performed by the link creator obtains the common key by decrypting the public data using the secret key of the link creator per se. The system then decrypts each group using these keys. The system then generates a table composed of [link name, endpoint name, input/output] for each group on the basis of a link. The system propagates the records of each table to a parent. At this time, the system replaces the endpoint name with an element to which the group belongs. The system then encrypts the tables using the common key obtained in the initial step. The system encrypts the entire data thus obtained using the common key. The system adds to linked data indicating an authorized party a value obtained by encrypting the common key using the public key of the data and thus makes the data into public data.

A system of a portion related to a process performed by a referrer obtains a common key by decrypting the data received from the system of the portion related to a process performed by a domain data owner and the data received from the system of the portion related to a process performed by a link creator using a secret key. Using the common key thus obtained, the system decrypts the data received from the system of the portion related to a process performed by a domain data owner and the data received from the system of the portion related to a process performed by a link creator. At this time, the system propagates the records of the table to a child and, if the link names are the same, replaces the records of the table with the records of the child. The system then generates a view from two trees. There are generally multiple domain data owners and multiple link creators and therefore this process is repeated the number of times equal to the number of combinations thereof.

Domain data handled by the present invention is confidential information of each organization and encrypted in such a manner that it can be referred to by only the authorized party designated by the data owner. At this time, the authorized party of data is designated in accordance with the hierarchy. Examples of the hierarchy include a hierarchy of folders in a file system, a hierarchy of chapters, sections, paragraphs, sentences, and words in a document, and a hierarchy of the inclusion relationships between model (design drawing, parts list, etc.) elements.

The present invention assumes the following constraints:
The domain data owner does not know how pieces of data will be associated with each other.
The link creator does not know the authorized parties of data designated by the domain data owner.

The link creator and the referrer can decrypt only data where they are designated as the authorized party.

An embodiment of the present invention will be described with reference to the accompanying drawings. Unless otherwise specified, same reference signs designate same components through the drawings. It is to be appreciated that what is described below is one embodiment of the present invention and there is no intent to limit the invention to the description of the embodiment.

Figure 2:
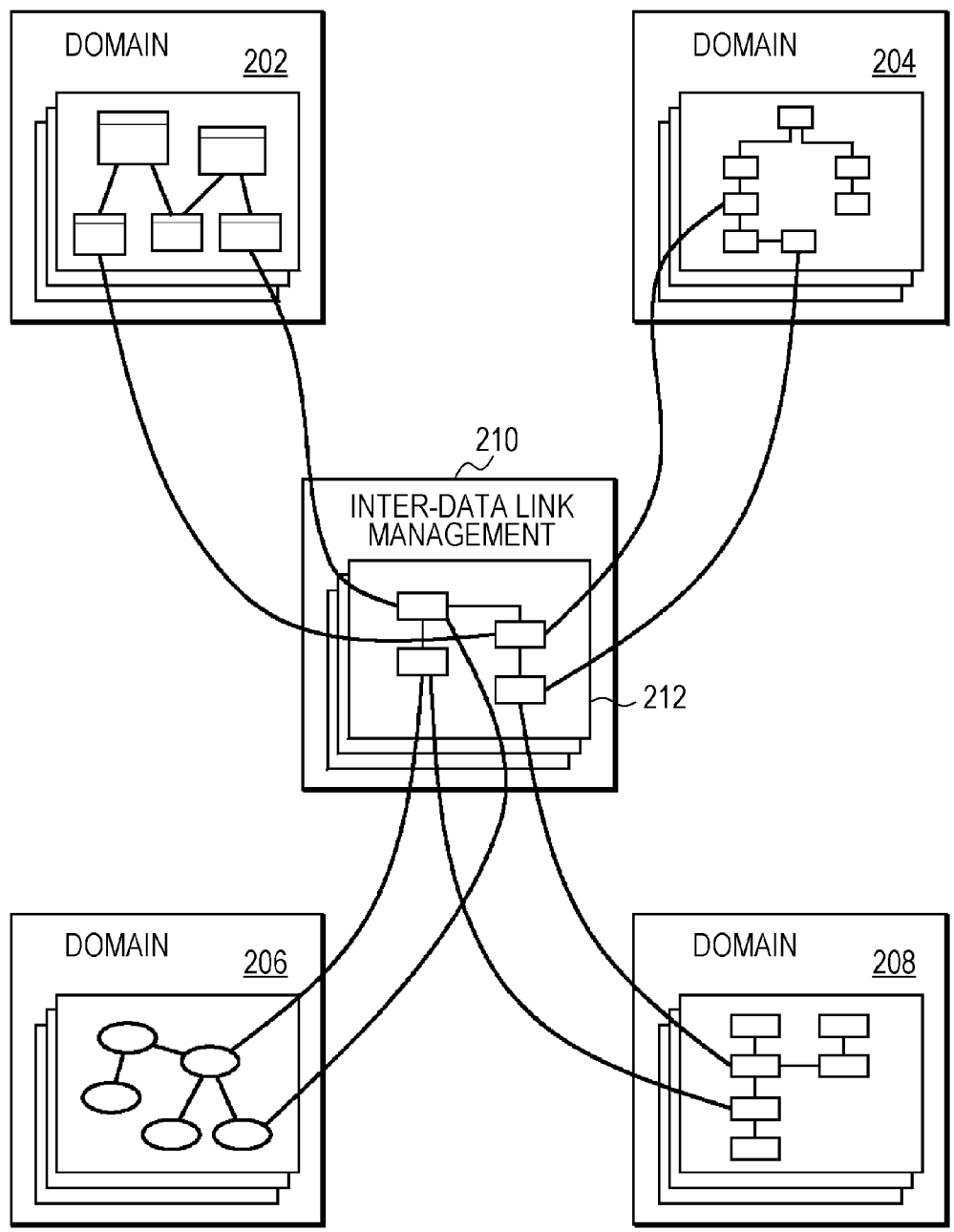
FIG. 2 is a diagram showing a view for centrally managing information on the associations between domains.

In FIG. 2, the figure depicts a schematic diagram showing an entire hardware configuration according to the embodiment of the present invention. Domains 202, 204, 206, and 208 represent computers in individual domains. The domains here refer to those such as system model, requirement management, control analysis, CAD, electric/electronic circuit, component configuration management, and installed software illustrated in FIG. 1.

Data specific to the tool used by each domain is stored in a storage device, preferably, a hard disk drive of the computer in the domain. Examples of such data include, but not limited to, the software design data UML, the hardware design data SysML, XML, which is supported by the tool for data exchange, and the electronic design data exchange format EDIF. The data can be in a form specific to the tool in the domain.

In each domain, the data can be formed in the form of a DAG or stored in the form of a graph other than a DAG or in the form of data other than a graph. Four domains shown in FIG. 2 are illustrative only and there can be more or any number of domains. Note that generating association information requires at least two domains.

An inter-data link management block (function) 210 is a function of creating a view where pieces of data are associated with each other. It is implemented on the computer. The inter-data link management block 210 is connected to the computers implementing the domains 202, 204, 206, and 208 via a network. It includes a program having the function of establishing connection between at least two domains in accordance with an operation of the operator and creating a view of links between pieces of data in the at least two domains.

Figure 3:
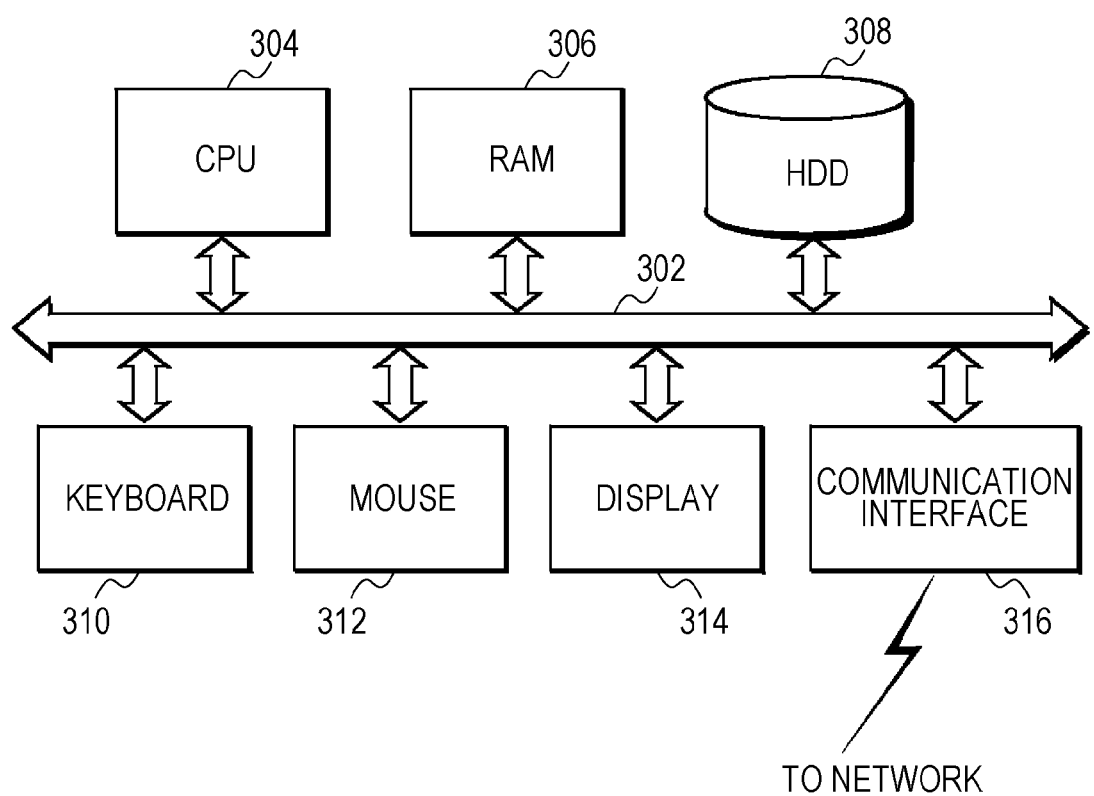
FIG. 3 is a block diagram showing the hardware configuration of a computer used in an embodiment of the present invention.

FIG. 3 is a functional diagram of a computer for implementing the domains 202, 204, 206, and 208 and the configuration of the inter-data link management function 210. In the present invention, though not shown in FIG. 2, it is preferable to dispose multiple computers implementing a reference function for referring to link information generated by the inter-data link management function 210 under predetermined security conditions. The computers implementing the reference function can have a hardware configuration similar to that of the computer implementing the configuration of the inter-data link management function 210. The computers implementing the domains can also serve as the computers implementing the reference function. That is, a single computer can have both the domain function and the reference function.

In FIG. 3, a CPU 304, a main memory (RAM) 306, a hard disk drive (HDD) 308, a keyboard 310, a mouse 312, and a display 314 are connected to a system bus 302. The CPU 304 is preferably based on a 32-bit or 64-bit architecture and can be, for example, Pentium™ 4 Core™ 2 DUO, or Xeon™ available from Intel Corporation, or Athlon™ available from Advanced Micro Devices, Inc. The main memory 306 preferably has a capacity of not less than 4 GB. The hard disk drive 308 preferably has a capacity of, e.g., not less than 500 GB.

Although not shown, an operating system is previously stored on the hard disk drive 308. The operating system can be of any type, including Linux™; Windows™ 7, Windows XP™, or Windows™ 2000 available from Microsoft Corporation; or Mac OS™ available from Apple Inc, so long as it is adaptable to the CPU 304.

For the computer implementing the inter-data link management function 210, a link creating tool (represented by reference sign 420 in FIG. 4) and the like are stored on the hard disk drive 308. For the computers implementing the domains 202, 204, 206, and 208, a grouping tool for perform grouping on the basis of information designating the authorized party of domain data (represented by reference sign 410a in FIG. 4), a grouped data encryption tool (represented by reference sign 414a in FIG. 4), and the like are stored on the hard disk drive 308. For the computers implementing the reference function, a reference tool (represented by reference sign 426a in FIG. 4) or the like is stored on the hard disk drive 308. These modules are generated by an existing programming language implementation, such as C, C++, C#, or Java®, and loaded into the main memory 306 and executed by the function of the operating system as necessary. The operation of these modules will be described in more detail with reference to the flowchart of FIG. 6.

The operator uses the keyboard 310 and the mouse 312, for example, to operate the grouping tool, the link creating tool, the reference tool, and the like. The display 314 is preferably a liquid crystal display and can be of any resolution, including XGA (resolution 1024×768) or UXGA (resolution 1600× 1200). The display 314 is used for the operator to operate the computer implementing the domain, the inter-data link management function, and the reference function while visually checking information on data node or data link.

The system of FIG. 3 is connected to an external network such as a LAN or WAN via a communication interface 316 connected to the bus 302. The communication interface 316 exchanges data with a computer or the like having a different domain through a mechanism such as Ethernet™.

Figure 4:
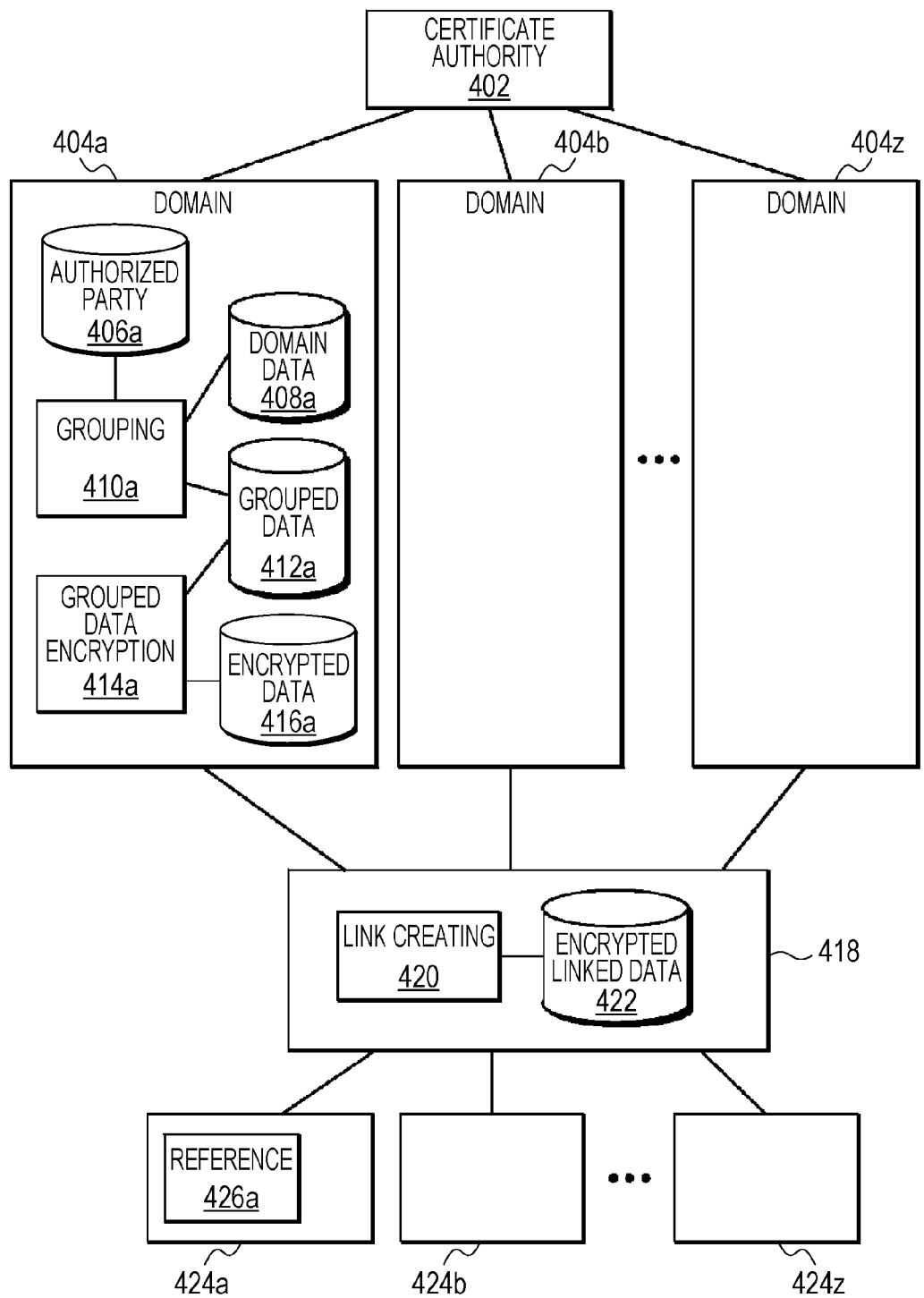
FIG. 4 is a block diagram showing the entire functional configuration of the embodiment of the present invention.

FIG. 4 is a block diagram showing hardware and functional configuration according to this embodiment. The system includes a certificate authority 402, computers 404a, 404b, . . . , 404z implementing a domain, a computer 418 implementing the inter-link management function, and computers 424a, 424b, . . . 424z implementing the reference function.

The computers 404a, 404b, . . . , 404z implementing a domain, the computer 418 implementing the inter-data link management function, and the computers 424a, 424b, . . . , 424z implementing the reference function all preferably have the hardware configuration shown in FIG. 3.

While each domain can generate a public key and a secret key using a predetermined algorithm, each domain preferably obtains these keys from the certificate authority 402. While the computers 404a, 404b, . . . , 404z implementing a domain hold different domain data, they have the same hardware and functional configurations. For this reason, the computer 404a will be described as a representative.

The computer 404a includes data 406a indicating the authorized parties of information and domain data 408a. The domain data 408a preferably includes data structured in the form of a directed acyclic graph (DAG). In the configuration of FIG. 3, the data 406a indicating the authorized parties of information and the domain data 408a are stored on the hard disk drive 308. The grouping tool 410a has the function of grouping the domain data 408a on the basis of the data 406a indicating the designated authorized parties of information.

The grouping process will be described with reference to the flowchart of FIG. 5 later. The grouped data 412a is preferably stored on the hard disk drive 308. The grouped data encryption tool 414a obtains a public key and a secret key from the certificate authority 402 for each group, encrypts the grouped data 412a using these keys, and stores resulting encrypted data 416a on the hard disk drive 308. The process performed by the grouping tool 410a and the process performed by the grouped data encryption tool 414a will be described in detail with reference to the flowchart of FIG. 8 later.

The computer 418 implementing the inter-data link management function includes the link creating tool 420. The operator of the computer 418 selects necessary data from among the encrypted data 416a, 416b, . . . , 416z using the link creating tool 420, encrypts the selected data, and stores the encrypted data on the hard disk drive 308 as linked data 422. The process performed by the link creating tool 420 will be described in detail with reference to the flowchart of FIG. 10 later.

There can be multiple computers 418 implementing the inter-data link management function, and they can generate different linked data. Alternatively, instead of disposing the computer 418 implementing the inter-data link management function, a different computer can perform the inter-data link management function and directly transmit the generated linked data to the computers 424a, 424b, . . . , 424z implementing the reference function.

The computers 424a, 424b, . . . , 424z implementing the reference function have the same hardware and functional configurations. For this reason, the computer 424a will be described as a representative.

The computer 424a implementing the reference function includes the reference tool 426a. The operator for performing the reference process receives the encrypted data 416a or the like from the computers 404a, 404b, . . . , 404z implementing a domain using the reference tool 426a, receives the encrypted linked data 422 from the computer 418 implementing the inter-data link management function, and generates a view. The process performed by the reference tool 426a will be described in detail with reference to the flowchart of FIG. 15 later.

Next, the process performed by the domain data grouping tool 410a will be described with reference to the flowcharts of FIGS. 5 and 6. The flowchart of FIG. 5 shows a grouping process. The input of this process is a domain data tree T=(V, E), which is the domain data 408a, and authorized party grant: $V \rightarrow 2^U$, which is the data 406a indicating the authorized parties. The sign "U" represents a set of referrers, and the sign "$2^U$" represents a set having a subset of the set of referrers as an element. At this time, the authorized party of data is designated in accordance with the hierarchy. Examples of the hierarchy include a hierarchy of folders in a file system, a hierarchy of chapters, sections, paragraphs, sentences, and words in a document, and a hierarchy of the inclusion relationships between model (design drawing, parts list, etc.) elements.

In step 502, the grouping tool 410a sets the root of the domain data tree T for p.

In step 504, the grouping tool 410a generates a new group by $G_p:=\{p\}$.

In step 506, the grouping tool 410a sets the new group generated in step 504 by $G:=\{G_p\}$.

In step 508, the grouping tool 410a calls a subroutine group(p). This process ends up outputting all the authorized party groups $G=\{G_1, G_2, \ldots, G_n\}$.

Figure 5:
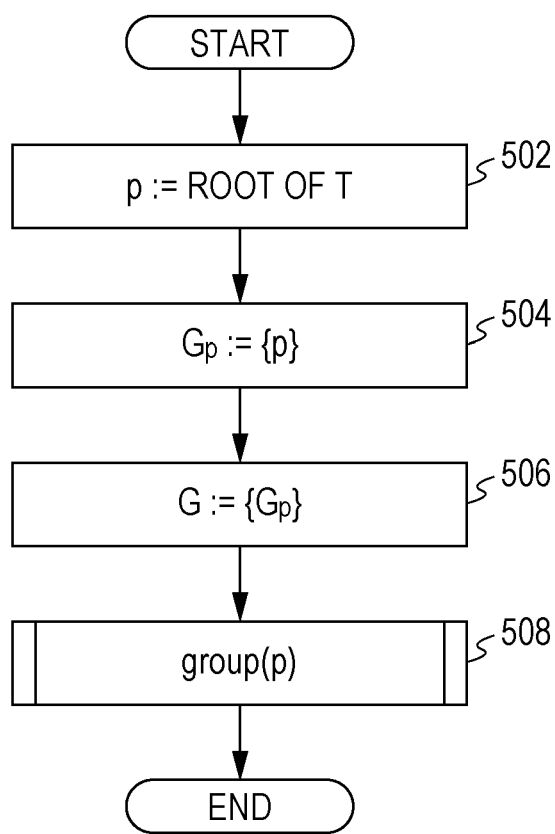
FIG. 5 is a flowchart showing a grouping process in a domain.
Figure 6:
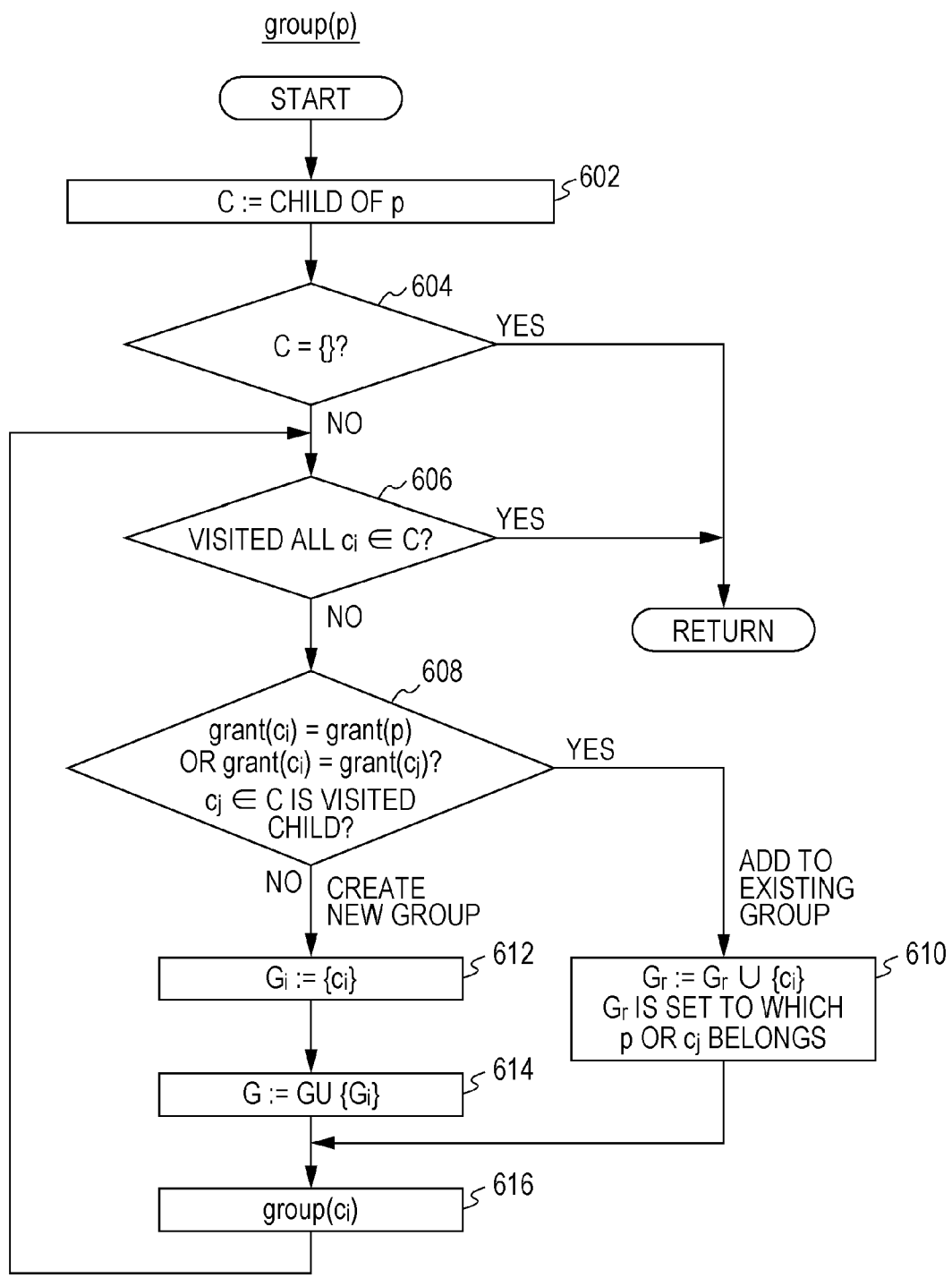
FIG. 6 is a flowchart showing a process performed by a subroutine group(p).

The flowchart of FIG. 6 shows a process performed by the subroutine group(p) called in the process shown by the flowchart of FIG. 5. In step 602, this subroutine sets a child of p for C.

In step 604, the subroutine determines whether C={ }, that is, whether C is empty. If so, the subroutine completes the process and returns.

If the subroutine determines that C is not empty, it determines in step 606 whether all ci∈C have been visited. If so, the subroutine completes the process and returns.

If there is $c_i \in C$ which has not been visited, the subroutine determines in step 608 whether grant($c_i$)=grant(p) or grant($c_j$) =grant(c) and whether there is j such that $c_j \in C$ is a visited child. The sign "grant($c_i$)" represents a set of referrers which are granted reference to ci. If the determination in step 608 is YES, the subroutine adds, in step 610, $c_i$ to the existing groups by $G_r:=G_r \cup \{c_i\}$. The sign "$G_r$" represents a set to which p or $c_j$ belongs.

If the determination in step 608 is NO, the subroutine in step 612 generates a new group by $G_i:=\{c_i\}$ and in step 614 adds $\{G_i\}$ to the groups by $G:=G \cup \{G_i\}$.

The subroutine proceeds from any of step 610 and step 612 to step 616 and then recursively calls its own process group ($c_i$) and returns to step 606.

Figure 7:
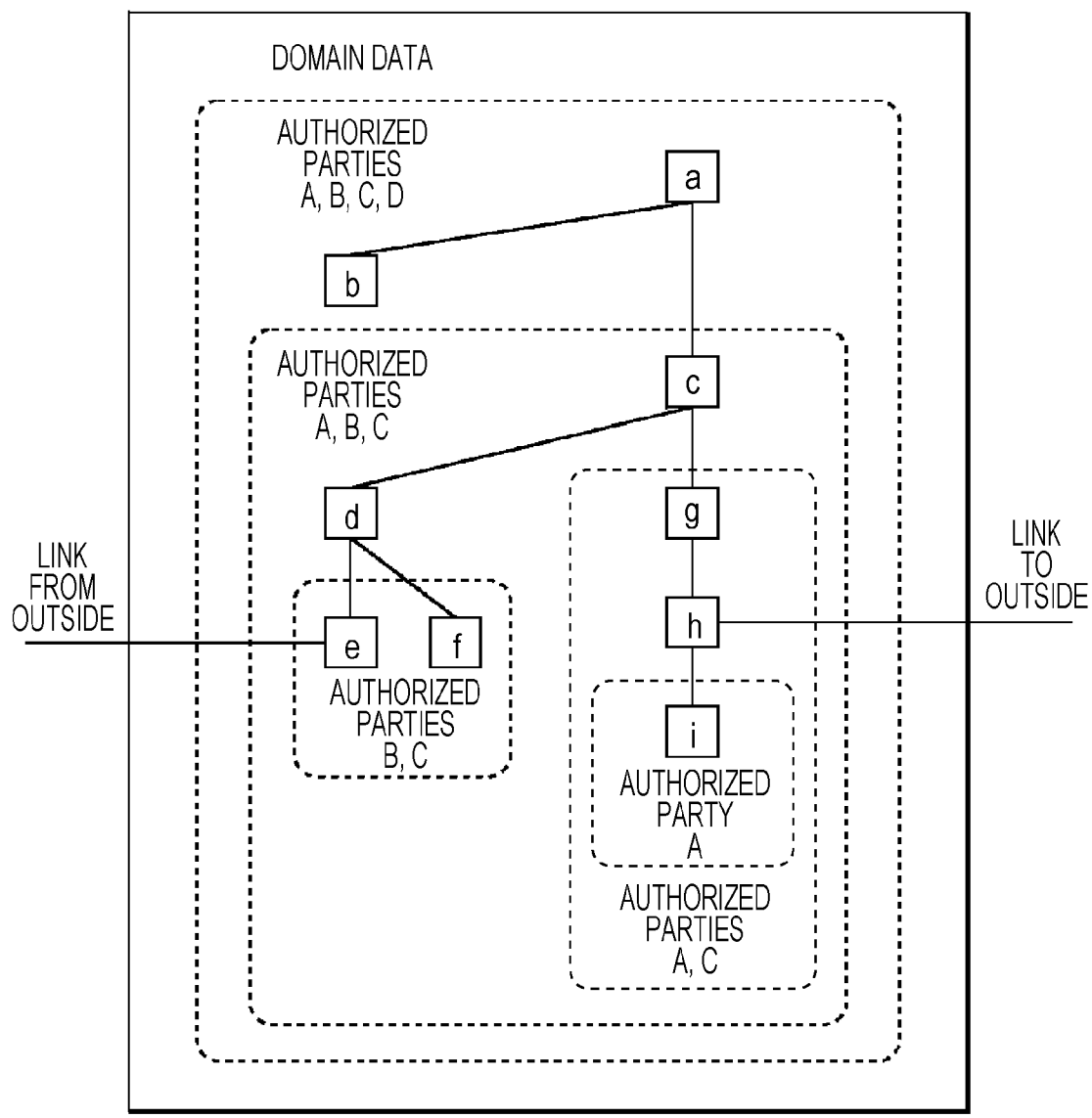
FIG. 7 is a diagram showing an example of grouping in a domain.

FIG. 7 shows grouped domain data generated by the above-mentioned process and the authorized party(s) of each group. The groups are enclosed by dotted lines.

Figure 8:
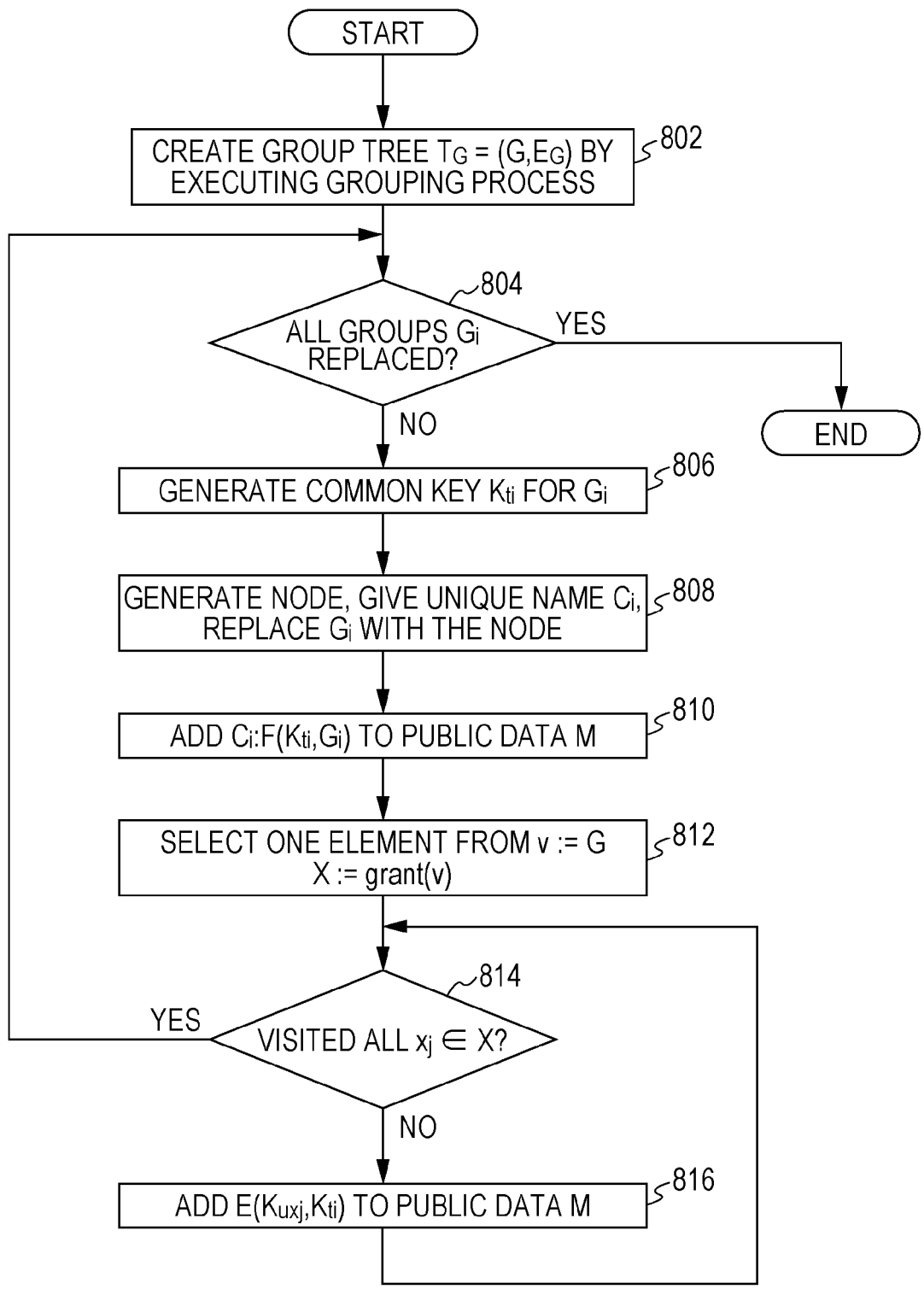
FIG. 8 is a flowchart showing a group encryption process.

FIG. 8 is a flowchart showing a group encryption process performed by the grouped data encryption tool 414a. The input of this process is a domain data tree T=(V,E), which is the domain data 408a, and an authorized party "grant: $V \rightarrow 2^U$," which is the authorized party data 406a. The sign "U" represents a set of referrers. The sign "$2^U$" represents a set having a subset of the set of referrers as an element.

In step 802, the grouped data encryption tool 414a generates a group tree $T_G=(G, E_G)$ by performing a grouping process. "A grouping process" refers to the process shown by the flowcharts of FIGS. 5 and 6 described above, and a group tree $T_G$ refers to the grouped data 412a in FIG. 4.

In stet 804, the grouped data encryption tool 414a determines whether all groups $G_i$ have been replaced. If so, it completes the process.

If all the groups $G_i$ have not been replaced, the grouped data encryption tool 414a proceeds to step 806 and generates a common key $K_{ti}$ for the groups $G_i$. While the group data encryption tool 414a can generate the common $K_{ti}$ in accordance with an original processing routine, it preferably obtains it from the certificate authority 402.

In step 808, the grouped data encryption tool 414a encrypts the groups $G_i$ using the common key $K_{ti}$, generates a node, gives a unique name $C_i$ to the node, and replaces the encrypted data with that node.

In step 810, the grouped data encryption tool 414a adds $C_i$:F($K_{ti}$,$G_i$) to public data M. The sign "F($K_{ti}$,$G_i$)" represents data obtained by encrypting the groups Gi using the common $K_{ti}$. With regard to F($K_{ti}$,$G_i$), the entire graph including not only all data of nodes included in the groups $G_i$ but also an edge set $E_i=\{(v_1,v_2)|v1 \in G_i, v2 \in G_i\}$ is encrypted.

In step 812, the grouped data encryption tool 414a selects one element from G, defines it as v, and defines a set of grant(v), which is the authorized party of v, as X.

In step 814, the display grouped data encryption tool 414a determines whether all xj∈X have been visited. If not so, it in step 816 adds E($K_{uxj}$,$K_{ti}$), which is a value obtained by encrypting the common key $K_{ti}$ using a public key $K_{uxj}$ of the authorized party, to the public data M. When all $x_j \in X$ are visited in this way, the process returns to step 804.

Figure 9:
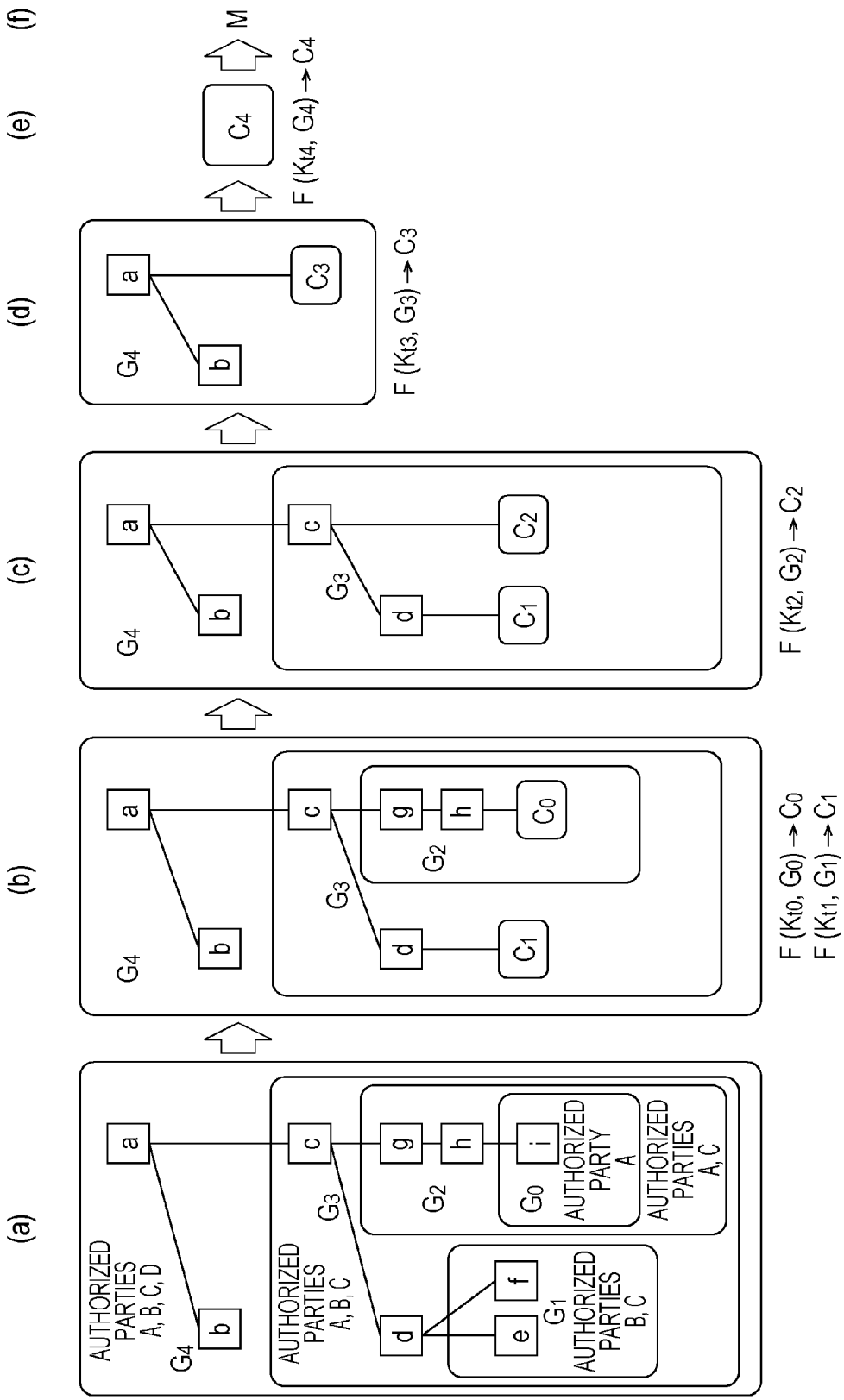
FIG. 9 includes diagrams showing an example of the group encryption process.

FIG. 9 includes diagrams showing the aspect in which the process shown by the flowchart of FIG. 8 is applied to the grouped domain data shown in FIG. 7 in the order of (a), (b), (c), (d), (e), and (f). This process transforms the public data M as follows.

$$M=<E(K_{uA},K_{t0}), E(K_{uB},K_{t1}), E(K_{uC},K_{t1}), E(K_{uA},K_{t2}),$$
$$E(K_{uC},K_{t2}), E(K_{uA},K_{t3}), E(K_{uB},K_{t3}), E(K_{uC},K_{t4}),$$
$$E(K_{uA},K_{t4}), E(K_{uB},K_{t4}), E(K_{uC},K_{t4}), E(K_{uD},K_{t4}),$$
$$C_0{:}F(K_{t0},G_0), C_1{:}F(K_{t1},G_1), C_2{:}F(K_{t2},G_2), C_3{:}F$$
$$(K_{t3},G_3), C_4{:}F(K_{t4},G_4)>$$

Figure 10:
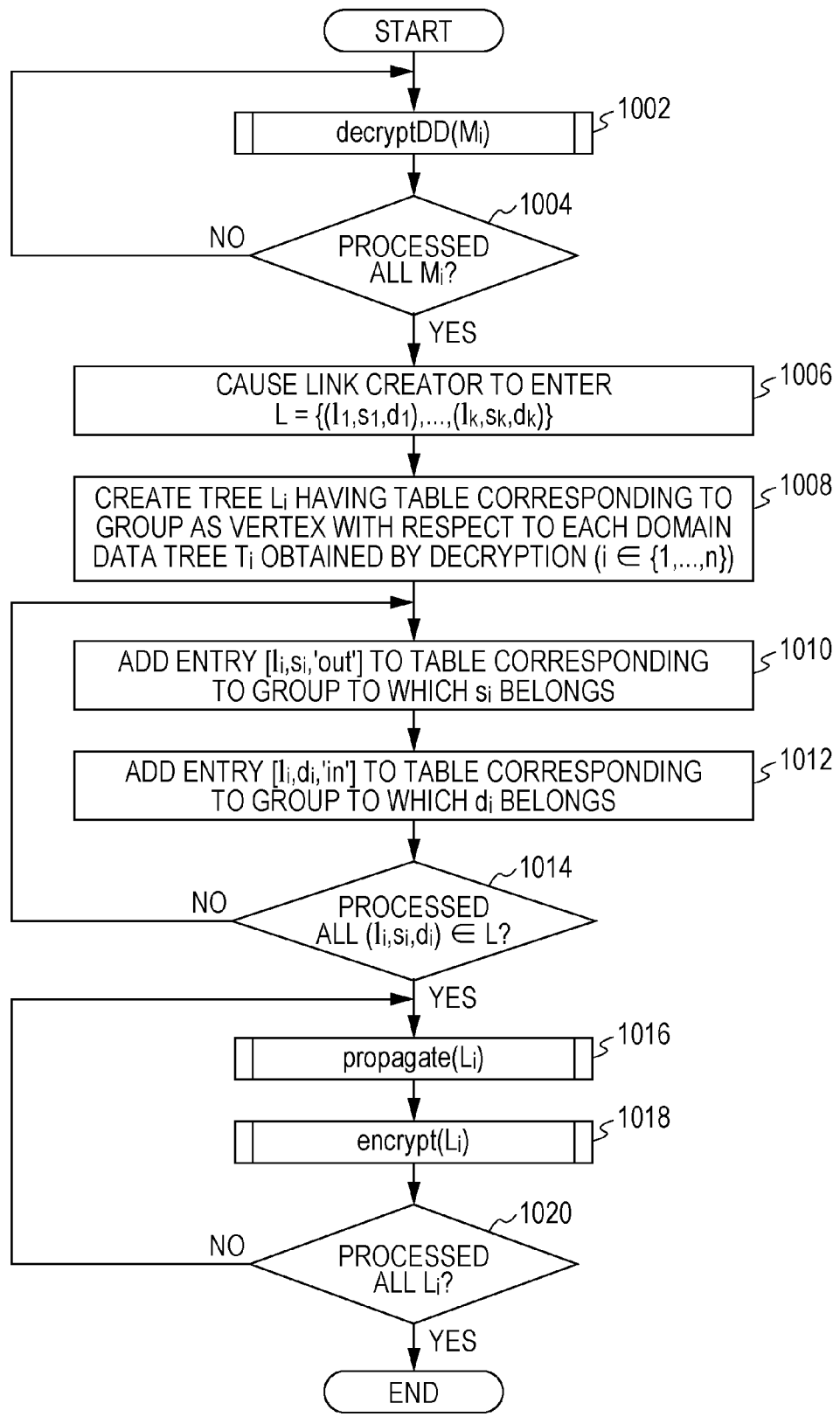
FIG. 10 is a flowchart showing a link creating process.

Referring now to the flowchart of FIG. 10, the process performed by the link creating tool 420 will be described. The input of this process is encrypted public domain data $M_1, \ldots, M_n$.

In step 1002, the link creating tool 420 calls a subroutine decryptDD and decrypts $M_i(i=1, \ldots, n)$. In step 1004, the link creating tool 420 determines whether all $M_i$ have been processed. If not so, it returns to step 1002.

When all Mi are decrypted in this way, the link creating tool 420 proceeds to step 1006 and causes the link creator, which is the operator of the computer 418, to input a link $L=\{(I_i,s_i,d_i), \ldots, (I_k,s_k,d_k)\}$. $I_i$ represents a name, $s_i$ represents the link-source node, and $d_i$ represents the link-destination node.

In step 1008, the link creating tool 420 generates a tree $L_i$ having a table corresponding to the group as an vertex with respect to each domain data tree $T_i$ obtained by the decryption ($i \in \{1, \ldots, n\}$).

In step 1010, the link creating tool 420 adds an entry $[I_i,s_i,'out']$ to the table corresponding to the group to which $s_i$ belongs.

In step 1012, the link creating tool 420 adds an entry $[I_i,d_i,'in']$ to the table corresponding to the group to which $d_i$ belongs.

In step 1014, the link creating tool 420 determines whether all $(I_i,s_i,d_i) \in L$ have been processed. If not so, it returns to step 1010.

When all $(I_i,s_i,d_i) \in L$ are processed, the link creating tool 420, in step 1016, calls a subroutine propagate, executes propagate($L_i$) and then in step 1018 calls a subroutine encrypt and executes encrypt($L_i$).

In step 1020, the link creating tool 420 determines whether all $L_i$ have been processed. If not so, it returns to step 1016. If the link creating tool 420 determines in step 1020 that all $L_i$ have been processed, it completes the process.

Figure 11:
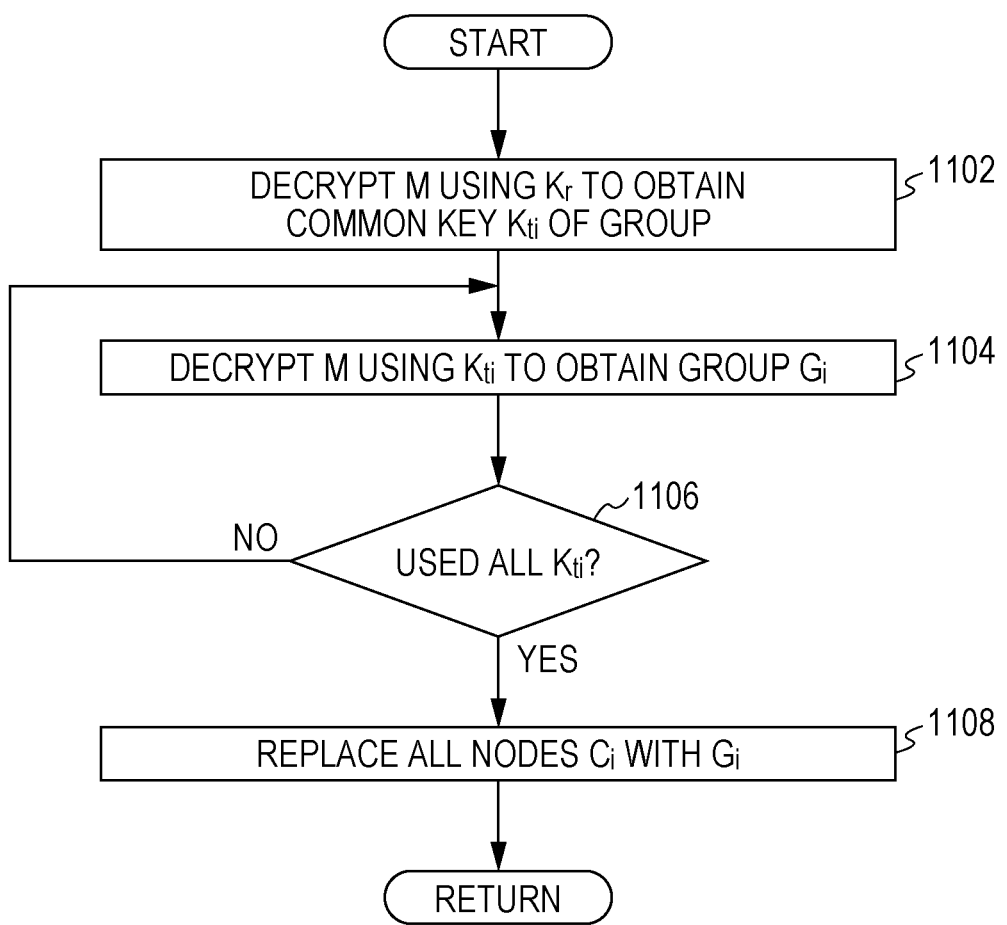
FIG. 11 is a flowchart showing a process performed by a subroutine decryptDD(M).

FIG. 11 is a flowchart showing the process performed by a subroutine decryptDD(M) having the public data M as an input. In step 1102, the subroutine decryptDD decrypts M using a secret key $K_r$ and obtains the common key $K_{ti}$ of the group.

In step 1104, the subroutine decryptDD obtains a group $G_i$ by decrypting M using $K_{ti}$.

In step 1106, the subroutine decryptDD determines whether all $K_{ti}$ have been used. If not so, it returns to step 1104. If it determines that all $K_{ti}$ have been used, the subroutine decryptDD replaces all nodes $C_i$ with $G_i$, completes the process, and returns to the caller.

Figure 12:
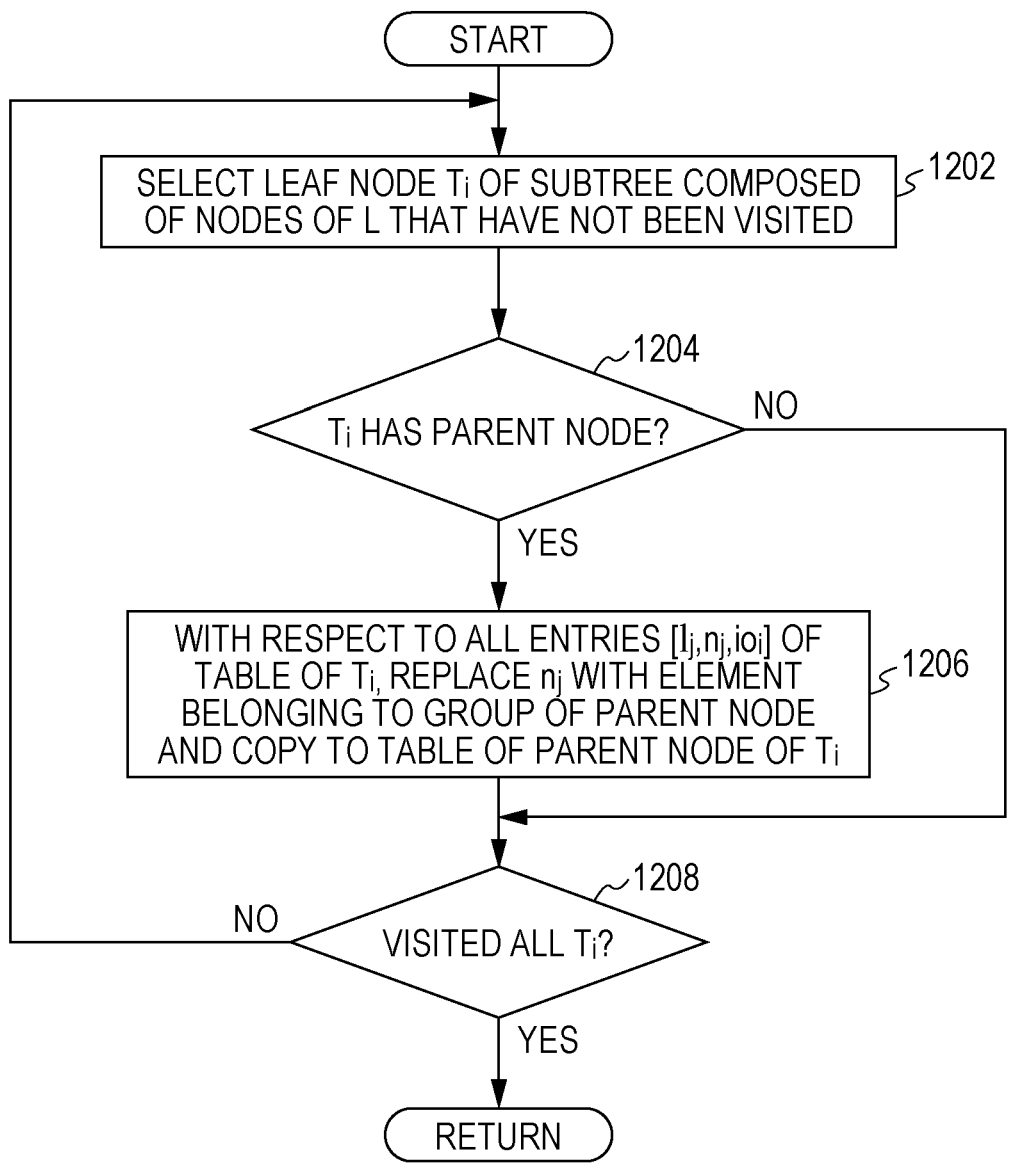
FIG. 12 is a flowchart showing a process performed by a subroutine propagate(L).

FIG. 12 is a flowchart showing a process performed by a subroutine propagate(L) having a tree L of a link table as an input. In step 1202, the subroutine propagate selects a leaf node $T_i$ of a subtree composed of nodes of L that have not been visited.

In step 1204, the subroutine propagate determines whether $T_i$ has a parent node. If so, in 1206 the subroutine transmit, with respect to all entries $[I_j,n_j,io_j]$ of the table of $T_i$, replaces $n_j$ with an element belonging to the group of the parent node and copies the element to the table of the parent node of $T_i$. If not so, step 1206 is skipped.

In step 1208, the subroutine propagate determines whether all $T_i$ have been visited. If so, it completes the process and returns to the caller. If not so, it returns to step 1202.

Figure 13:
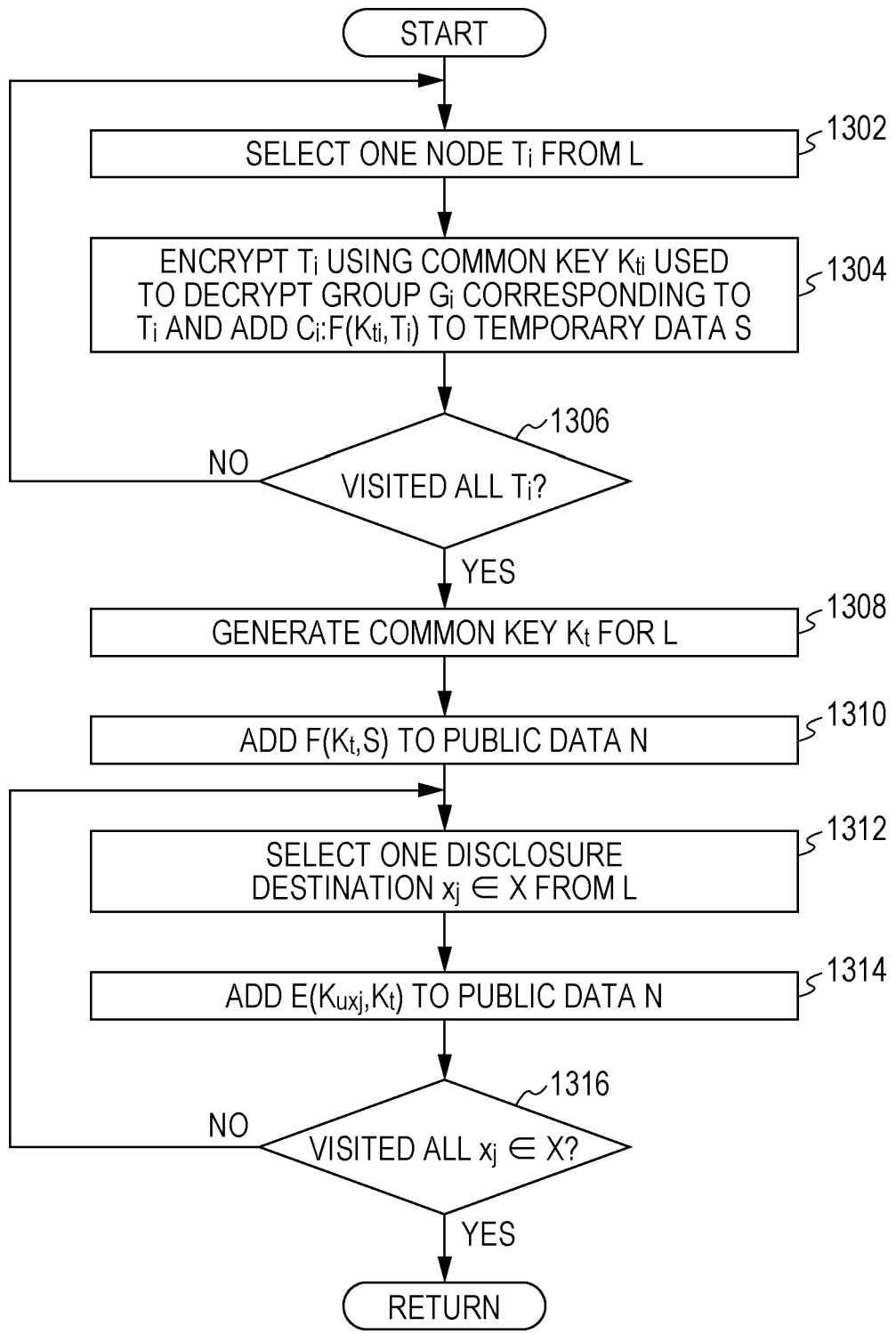
FIG. 13 is a flowchart showing a process performed by a subroutine encrypt(L).

FIG. 13 is a flowchart showing a process performed by a subroutine encrypt(L) having the tree L of the link table as an input. In step 1302, the subroutine encrypt selects one node $T_i$ from L.

In step 1304, the subroutine encrypt decrypts $T_i$ using the common key $K_{ti}$ used to decrypt the group $G_i$ corresponding to $T_i$ and adds $C_i{:}F(K_{ti},T_i)$ to temporary data S.

In step 1306, the subroutine encrypt determines whether all $T_i$ have been visited. If not so, it returns to step 1302.

When the subroutine encrypt visits all $T_i$ in this way, it in step 1308 generates a common key $K_t$ for L. It preferably receives the common key $K_t$ from the certificate authority 402.

In step 1310, the subroutine encrypt adds $F(K_t,S)$ to public data N. In step 1312, the subroutine encrypt selects one authorized party $x_j \in X$ from L and in step 1314 adds $E(K_{uxj},K_t)$ to the public data N.

In step 1316, the subroutine encrypt determines whether all $x_j \in X$ have been visited. If so, it completes the process and returns to the caller. If not so, it returns to step 1312.

Figure 14:
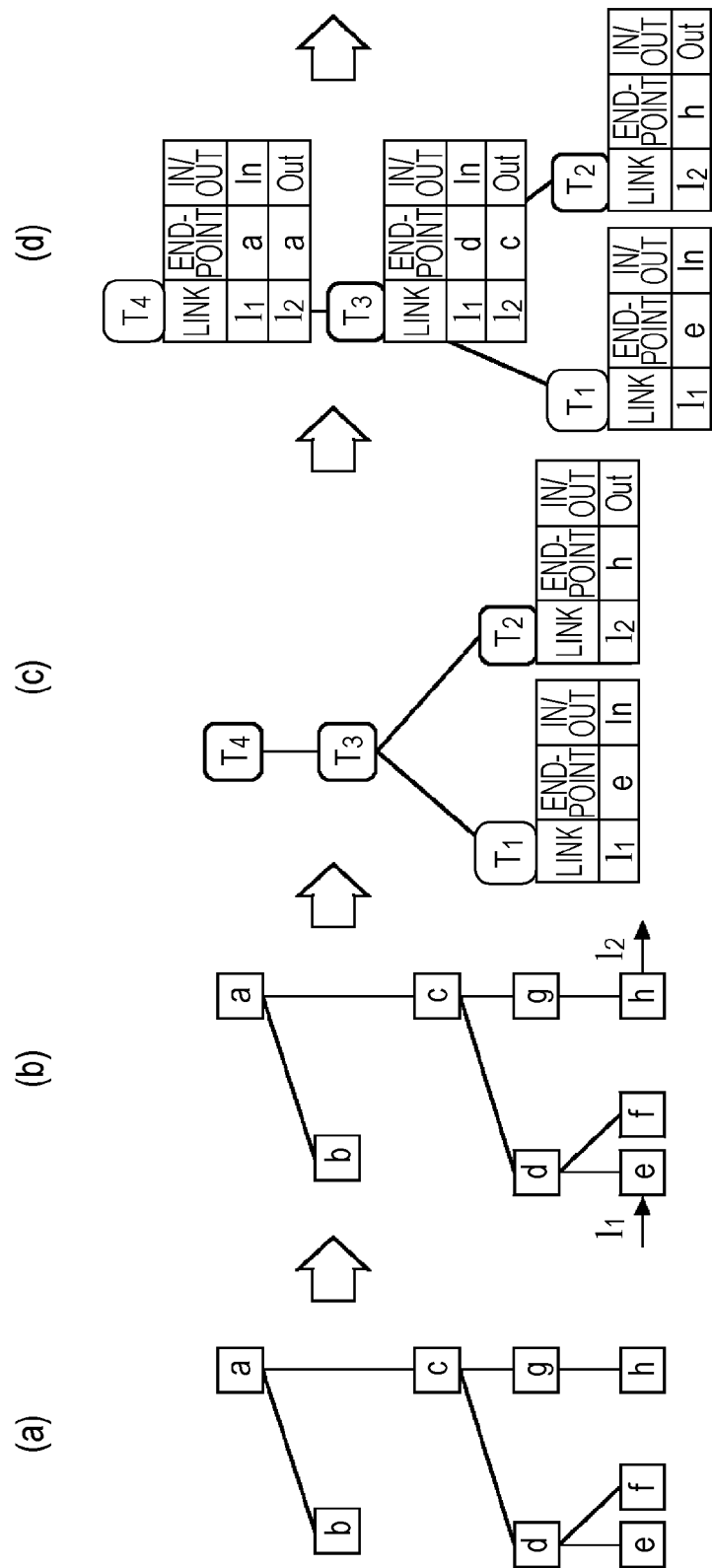
FIG. 14 includes diagrams showing an example of the link creating process.

FIG. 14 includes diagrams showing an example of the process performed by the link creating tool 420. In FIG. 14(a), the link creating tool 420 obtains common keys $K_{t1}$, $K_{t2}$, $K_{t3}$, and $K_{t4}$ by decrypting M using a secret key $K_{rC}$. The link creating tool 420 then replaces the name $C_i$ with the decrypted data $G_i$. Note that at this time, the link creating tool 420 cannot obtain $K_{t0}$ and therefore cannot obtain i.

In FIG. 14(b), the link creating tool 420 adds links to the data.

In FIG. 14(c), the link creating tool 420 creates a table $T_i$ composed of [link name, endpoint name, input/output] for each group $G_i$ on the basis of the links.

In FIG. 14(d), the link creating tool 420 propagates the records of the table Ti to the parent. At this time, the endpoint is replaced with an element to which $G_i$ belongs.

The link creating tool 420 then obtains the following data by encrypting $T_i$ (in this example, i=1, . . . , 4) using the common key $K_{ti}$ obtained in the initial step.

$$C_1{:}F(K_{t1},T_1)$$

$$C_2{:}F(K_{t2},T_2)$$

$$C_3{:}F(K_{t3},T_3)$$

$$C_4{:}F(K_{t4},T_4)$$

Subsequently, the link creating tool 420 encrypts the entire data above using the common key $K_t$. The link creating tool 420 then adds, to the encrypted data, $E(K_{uX},K_t)$ obtained by encrypting the common key $K_t$ using a public key $K_{uX}$ of the authorized party $X \in \{A,B\}$ of the link. Thus, the following public data is obtained.

$$N=<E(K_{uA},K_t), E(K_{uB},K_t), F(K_t,<C_1{:}F(K_{t1},T_1), C_2{:}F$$
$$(K_{t2},T_2), C_3{:}F(K_{t3},T_3), C_4{:}F(K_{t4},T_4)>)>$$

Figure 15:
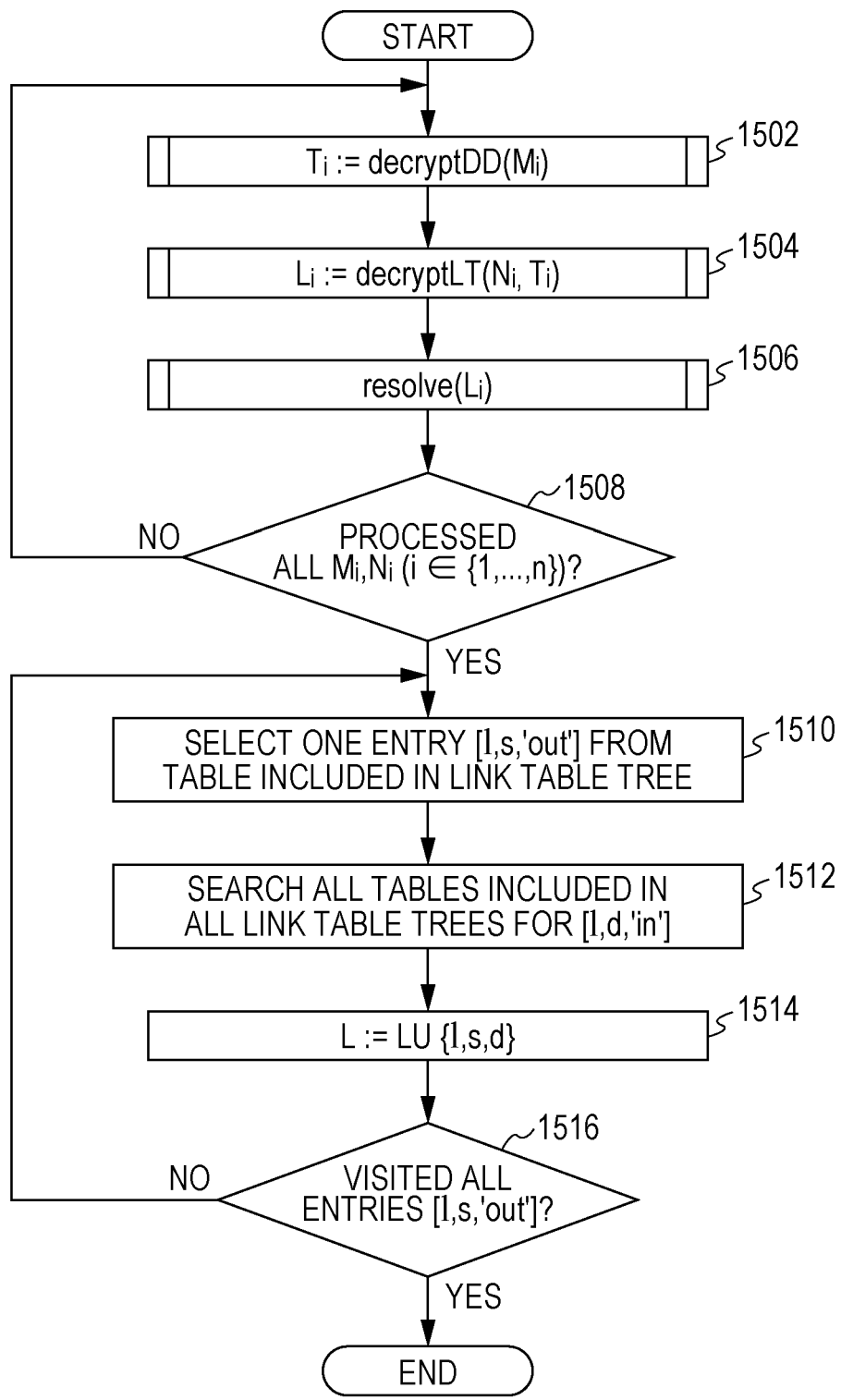
FIG. 15 is a flowchart showing a reference process.

Referring now to the flowchart of FIG. 15, the process performed by the reference tool 426a will be described. The input of this process is public domain data $M_1, \ldots, M_n$ and public domain data $N_1, \ldots, N_n$. In step 1502, the reference tool 426a calls the subroutine decryptDD($M_i$) and defines the result as $T_i$. The subroutine decryptDD has already been described with reference to FIG. 11.

In step 1504, the reference tool 426a calls a subroutine decryptLT(Ni,$T_i$) and defines the result as $L_i$. The subroutine decryptLT will be described with reference to the flowchart of FIG. 16 later.

In step 1506, the reference tool 426a executes a subroutine resolve($L_i$). The subroutine resolve will be described with reference to the flowchart of FIG. 17 later.

In step 1508, the reference tool 426a determines whether all $M_i$, $N_i$(i∈{1, . . . n}) have been processed and then returns to step 1502.

If the reference tool 426a determines in step 1508 that all $M_i$, $N_i$(i∈{1, . . . , n}) have been processed, it in step 1510 selects one entry [I,s,'out'] from a table included in a tree of a link table.

In step 1512, the reference tool 426a searches all tables included in all link table trees for [I,d,'in'].

In step 1514, the reference tool 426a adds an element to L using L:=L∪{(I,s,d)}. In step 1516, the reference tool 426a determines whether all entries [I,s,'out'] have been visited. If so, it completes the process. If not so, the process returns to step 1510. This process ends up outputting domain data tree $T_1$, . . . , $T_n$ and links L={($I_1$,$s_1$,$d_1$), . . . , ($I_n$,$s_n$,$d_n$)}.

Figure 16:
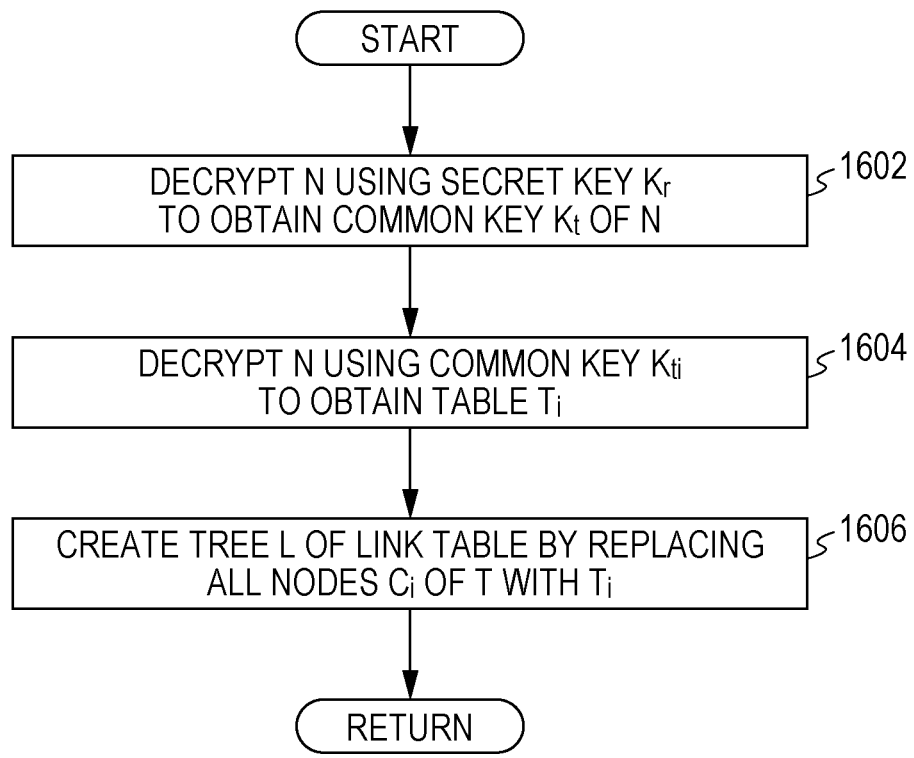
FIG. 16 is a flowchart showing a process performed by a subroutine decryptLT(N,T).

Referring now to the flowchart of FIG. 16, a process performed by a subroutine decryptLT(N,T) will be described. N represents public data, and T represents a domain data tree. In step 1602, the subroutine decryptLT obtains the common key $K_t$ of N by decrypting N using a secret key $K_r$.

In step 1604, the subroutine decryptLT further obtains a table $T_i$ by decrypting N using the common key $K_{ti}$.

In step 1606, the subroutine decryptLT generates a link table tree L by replacing all nodes $C_i$ of T with $T_i$ and completes the process and returns.

Figure 17:
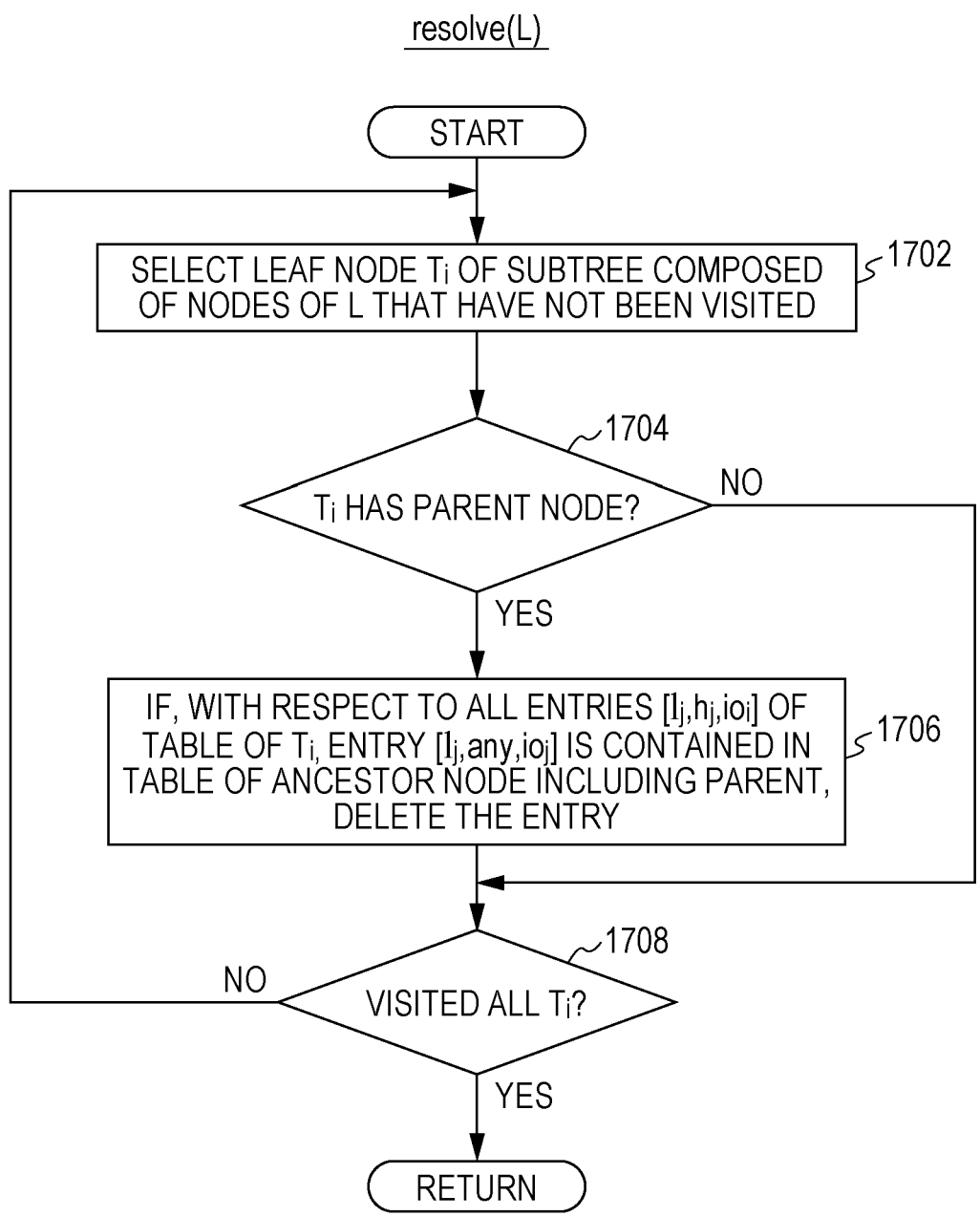
FIG. 17 is a flowchart showing a process performed by a subroutine resolve(L).

Referring now to the flowchart of FIG. 17, a process performed by a subroutine resolve(L) will be described. L represents a link table tree. In step 1702, the subroutine resolve selects a leaf node $T_i$ of a subtree composed of nodes of L that have not been visited.

In step 1704, the subroutine resolve determines whether $T_i$ has a parent node. If so, it proceeds to step 1706. If, with respect to all entries [$I_j$,$h_j$,$io_j$] of the table of $T_i$, an entry [$I_j$,any,$io_j$] is contained in the table of an ancestor node including a parent, the subroutine resolve deletes the entry. If the subroutine resolve determines in step 1704 that $T_i$ has no parent node, it simply skips step 1706.

In step 1708, the subroutine resolve determines whether all $T_i$ have been visited. If so, it completes the process and returns. If not so, the subroutine resolve returns to step 1702.

Figure 18:
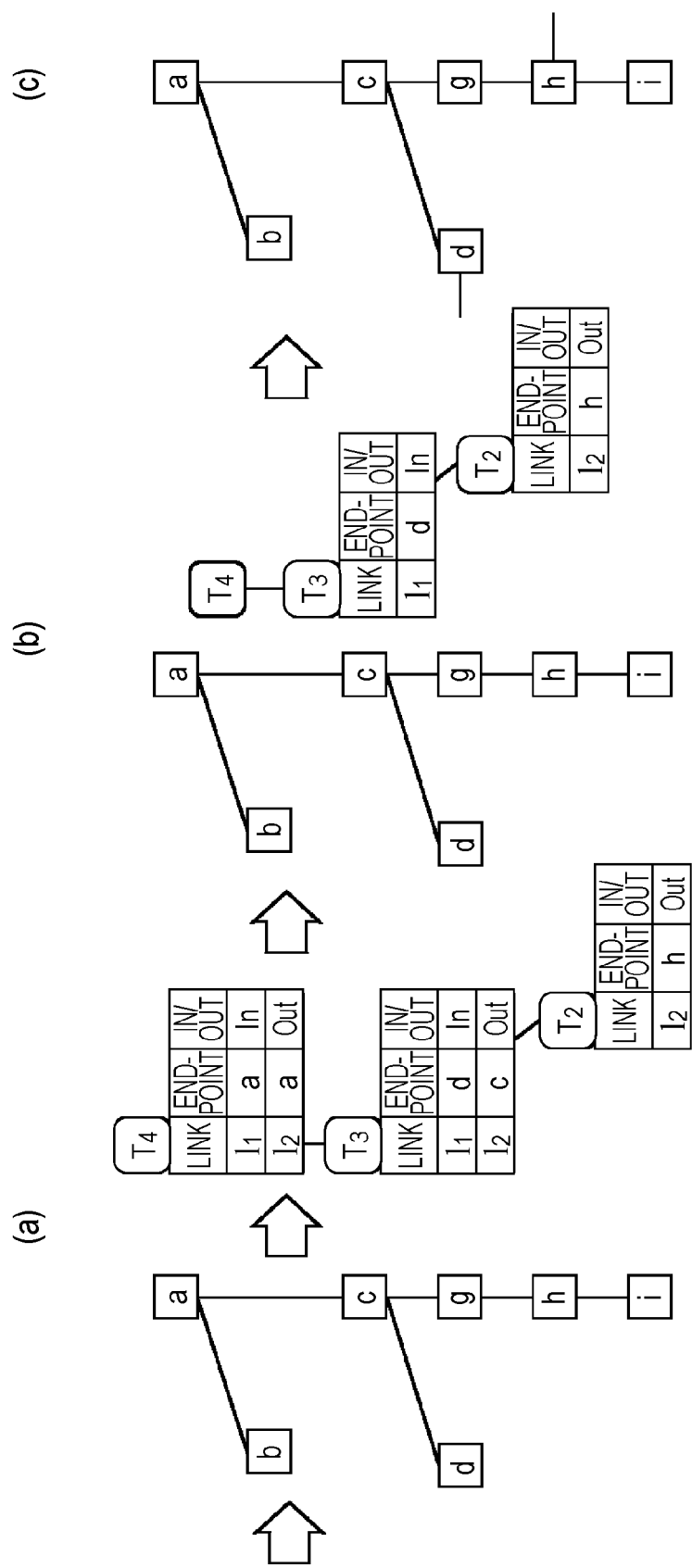
FIG. 18 includes diagrams showing an example of the reference process.

FIG. 18 includes diagrams showing an example operation of the reference tool 426a. Before proceeding to FIG. 18(a), the reference tool 426a obtains common keys $K_{t2}$, $K_{t3}$, $K_{t4}$, and $K_t$ by decrypting received M and N using a secret key $K_{rA}$. At this time, the operator of the reference tool 426a cannot decrypt $K_{t1}$ and therefore cannot obtain e or f. The reference tool 426a obtains a tree and tables shown in FIG. 18(a) by decrypting M and N using the obtained common key.

The reference tool 426a then propagates the records of $T_i$ to a child. If the link names are the same, the records are replaced with the records of the child. Thus, a tree and tables shown in FIG. 18(b) are obtained. Subsequently, the reference tool 426a generates a reference view from the two trees, as shown in FIG. 18(c). Generally, there are multiple domain data owners and multiple link creators. Accordingly, the above-mentioned process is repeated the number of times equal to the number of combinations of M and corresponding N.

While the respective computers of the domain data owner, the link creator, and the data referrer differ from each other in the above-mentioned embodiment, the algorithm can operate even when two or three of these computers overlap each other. In particular, if the domain data owner and the link creator are the same person, he or she can handle a graph structure that cannot be represented by a hierarchy alone, as domain data.

While the present invention has been described based on the particular embodiment, the invention is not limited to any particular operating system or platform and can be realized on any type of computer system. The present invention can be applicable to common domains or tools without being limited to any particular domain or tool.

We claim:

1. A computer-implemented system for providing a view of links between pieces of domain data having a tree structure in a plurality of domains stored in computers in accordance with given access permission, one or more of the computers comprising a processor for executing program instructions, the system comprising:
   domain data stored on a tangible storage device;
   a domain computer, a link creating computer, and a reference computer, connected together via a network;
   a program embodied on a tangible storage device for execution by the processor, the program having a plurality of program instructions to:
   group, by the domain computer, in each of the domains, domain data of the domain for authorized parties designated in accordance with the hierarchy of the domain;
   encrypt, by the domain computer, a group of leaves in the grouped data having a tree structure using a common key;
   generate first public data, by the domain computer, by adding a value to the data encrypted using the common key, the value being obtained by encrypting a common key of all groups using a public key of an authorized party;
   obtain, by the link creating computer, a common key by decrypting the first public data using a secret key of a link creator and decrypt the groups using the common key and the secret key;
   generate a table, by the link creating computer, for each group on the basis of a link in decrypted data;
   propagate, by the link creating computer, records of the table to a parent having a tree structure;
   generate second public data, by the link creating computer, by encrypting the table using a common key;
   obtain, by the link creating computer, a common key by decrypting the first public data and the second public data using a secret key;
   obtain a common key, by the reference computer, by decrypting the first public data and the second public data using a secret key; and
   generate a view, by the reference computer, by decrypting data received from a system of the link creator using the common key obtained by decrypting the first public data and the second public data using the secret key.

2. The system according to claim 1, wherein program instructions to generate the first public data further comprise instructions to:
   replace the encrypted group with an element of a name.

3. The system according to claim 2, wherein program instructions to decrypt the groups further comprise instructions to:
   replace the element of the name with an element to which the group belongs.

4. The system according to claim 1, wherein program instructions to generate a view further comprise instructions to:
   propagate records of the table to a child and, if link names are the same, replace the records of the table with records of the child.

5. The system according to claim 1, wherein one or more of the domain computer, the link creating computer, and the reference computer comprise a plurality of computers.

6. The system according to claim 1, wherein said domain computer also serves as the reference computer.

7. A computer-implemented method for providing a view of links between pieces of domain data having a tree structure in a plurality of domains stored in computers, including a domain computer, a link creating computer, and a reference computer connected together via a network, in accordance with given access permission, the method comprising the steps of:
- grouping, by the domain computer, domain data of each domain for authorized parties designated in accordance with the hierarchy of the domain;
- encrypting, by the domain computer, a group of leaves in the grouped data having a tree structure using a common key;
- generating, by the domain computer, first public data by adding a value to the data encrypted using the common key, the value being obtained by encrypting a common key of all groups using a public key of an authorized party;
- obtaining, by the link creating computer, a common key by decrypting the first public data using a secret key of a link creator and decrypt the groups using the common key and the secret key;
- generating, by the link creating computer, a table for each group on the basis of a link in decrypted data;
- propagating, by the link creating computer, records of the table to a parent having a tree structure;
- generating, by the link creating computer, second public data by encrypting the table using a common key;
- obtaining, by the link creating computer, a common key by decrypting the first public data and the second public data using a secret key;
- obtaining, by the reference computer, a common key by decrypting the first public data and the second public data using a secret key; and
- generating, by the reference computer, a view by decrypting data received from a method for the link creator using the common key obtained by decrypting the first public data and the second public data using the secret key.

8. The method according to claim 7, wherein said step of generating the first public data comprises the step of replacing the encrypted group with an element of a name.

9. The method according to claim 8, wherein said step of decrypting the groups comprises the step of replacing the element of the name with an element to which the group belongs.

10. The method according to claim 7, wherein said step of generating a view comprises the step of:
- propagating records of the table to a child and, if link names are the same, replacing the record of the table with records of the child.

11. The method according to claim 7, wherein each of said domain computer, said link creating computer, and said reference computer comprises a plurality of computers.

12. The method according to claim 11, wherein said domain computer also serves as the reference computer.

13. A non-transitory computer readable storage medium tangibly embodying a computer readable program code having computer readable instructions for providing a view of links between pieces of domain data having a tree structure in a plurality of domains stored in computers, including a domain computer, a link creating computer, and a reference computer connected together via a network, in accordance with given access permission, the method comprising the steps of:
- grouping, by the domain computer, domain data of each domain for authorized parties designated in accordance with the hierarchy of the domain;
- encrypting, by the domain computer, a group of leaves in the grouped data having a tree structure using a common key;
- generating, by the domain computer, first public data by adding a value to the data encrypted using the common key, the value being obtained by encrypting a common key of all groups using a public key of an authorized party;
- obtaining, by the domain computer, a common key by decrypting the first public data using a secret key of a link creator and decrypt the groups using the common key and the secret key;
- generating, by the link creating computer, a table for each group on the basis of a link in decrypted data;
- propagating, by the link creating computer, records of the table to a parent having a tree structure;
- generating, by the link creating computer, second public data by encrypting the table using a common key;
- obtaining, by the link creating computer, a common key by decrypting the first public data and the second public data using a secret key;
- obtaining, by the reference computer, a common key by decrypting the first public data and the second public data using a secret key; and
- generating, by the reference computer, a view by decrypting data received from a method for the link creator using the common key obtained by decrypting the first public data and the second public data using the secret key.

* * * * *